Aug. 20, 1940.   C. T. LENZKE   2,211,901
MEAT MOLDING DEVICE
Original Filed June 20, 1938   3 Sheets-Sheet 2
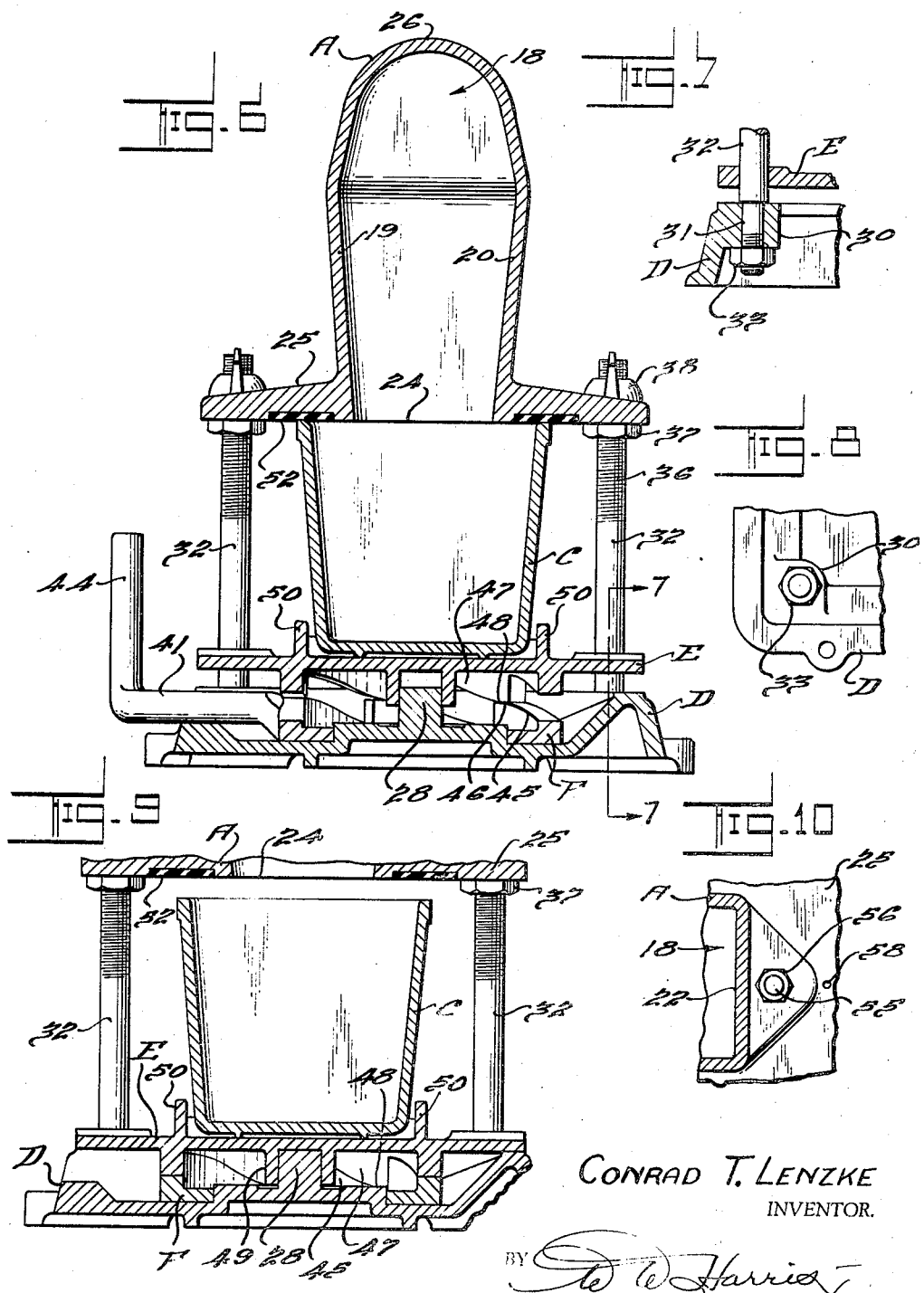
CONRAD T. LENZKE
INVENTOR.
BY
ATTORNEY.

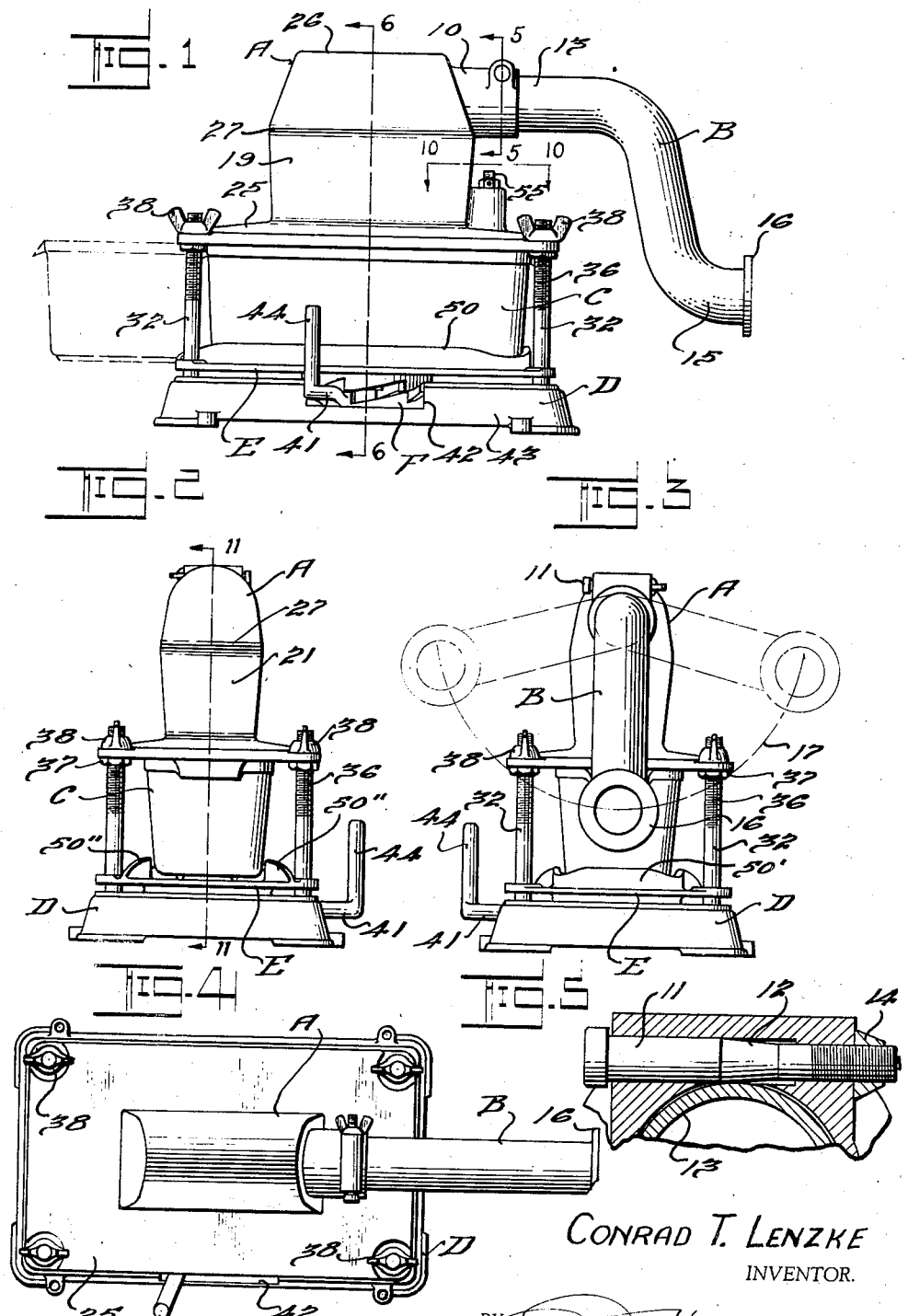

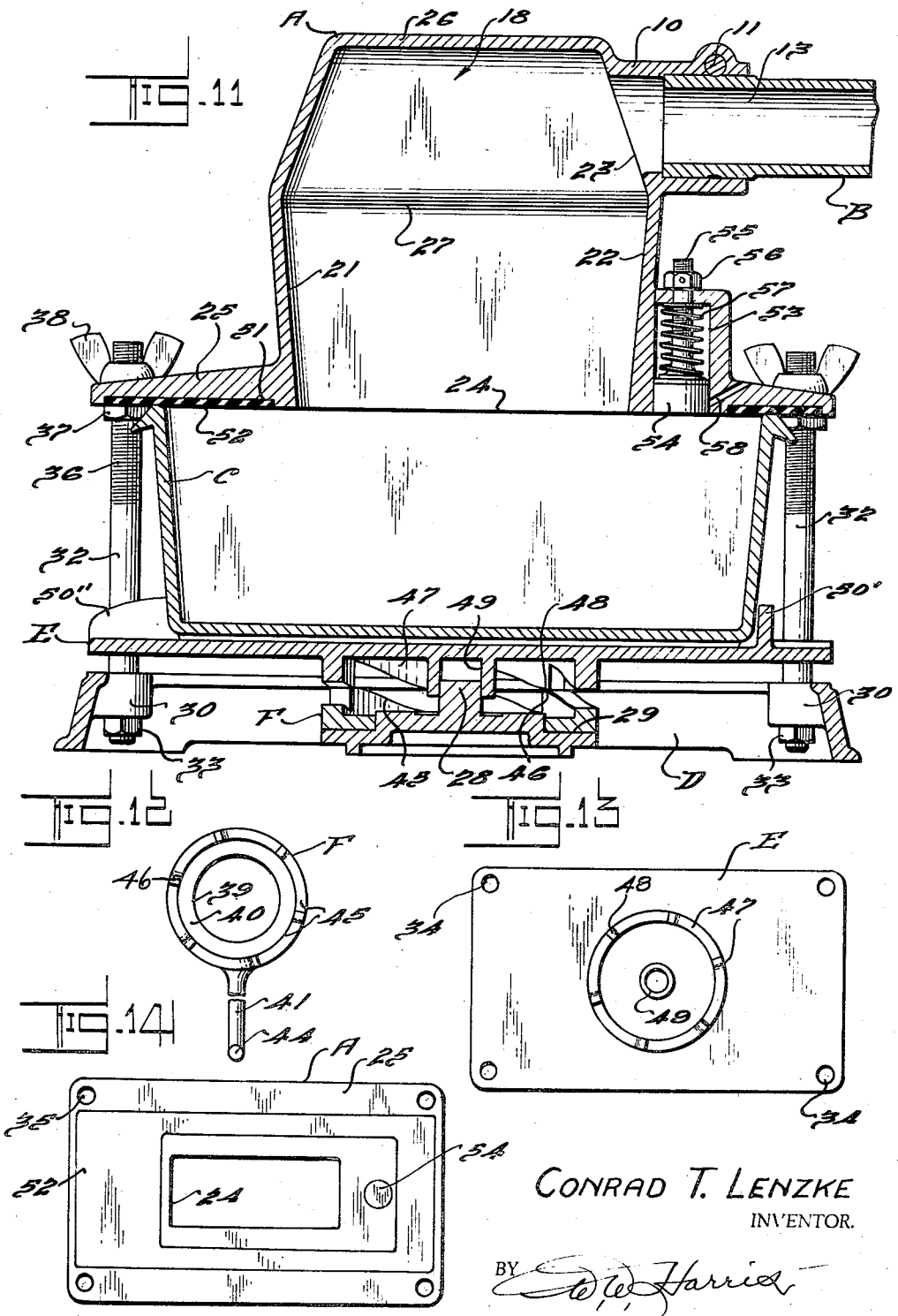

Patented Aug. 20, 1940

2,211,901

UNITED STATES PATENT OFFICE 2,211,901

MEAT MOLDING DEVICE

Conrad T. Lenzke, Detroit, Mich.

Application June 20, 1938, Serial No. 214,731
Renewed February 27, 1940

5 Claims. (Cl. 226—66)

My invention relates to molding devices and refers more particularly to improvements in devices for molding meat into loaves and other desired shapes.

Prior to my invention it has been customary to form loaves of ground meat by hand tamping the meat into a mold but such practices are slow and laborious and consequently expensive from the standpoint of commercial production of meat loaves. Furthermore, prior methods give rise to the formation of voids or air holes in the meat loaf and when the loaf is sliced the meat has an uneven and streaky appearance. Still further such methods result in considerable wastage and are unsanitary in that rather large quantities of the meat come in contact with the hands of the operator.

It is an object of my invention to provide means which will overcome the aforesaid difficulties and objections.

Another object of my invention is to provide a meat molding device of simple construction, easily cleaned and capable of operation in rapidly and efficiently forming meat loaves in rapid succession, the resulting loaves being uniform in shape and texture, free from voids, humps or bulges and streaks in the meat both before and after cooking or baking.

A further object of my invention is to provide means for molding meat under pressure, preferably by employing a mold and a meat pressure dispenser having means for rapidly clamping the mold in position for very quick filling and then releasing the mold to accommodate another mold to be filled.

Another object of my invention is to provide a meat molding device capable of adjustment to accommodate molds of varying size; a molding device having means to prevent the escape of the meat during molding; and a mold device having means for indicating to the operator a condition of a filled mold thereby saving molding time and insuring against undue pressure application to the molded meat loaf.

Further objects and advantages of the invention reside in the novel combination and arrangement of parts more particularly hereinafter described and claimed, reference being had to the accompanying drawings, in which:

Fig. 1 is a front elevational view of my meat molding device.

Fig. 2 is an elevational view of the Fig. 1 device looking at the left hand end as viewed in Fig. 1.

Fig. 3 is an elevational view looking at the opposite end.

Fig. 4 is a top plan view of the Fig. 1 device.

Fig. 5 is a detail sectional view taken as indicated by line 5—5 of Fig. 1.

Fig. 6 is a sectional elevational view taken as indicated by line 6—6 of Fig. 1.

Fig. 7 is a detail sectional view taken as indicated by line 7—7 of Fig. 6.

Fig. 8 is a bottom plan view of the detail illustrated in Fig. 7.

Fig. 9 is a view of a portion of the device as seen in Fig. 6 but showing the mold prior to clamping in position for filling.

Fig. 10 is a detail top plan view of the filling indicator, the view being taken as indicated by line 10—10 of Fig. 1.

Fig. 11 is a central elevational view of the device as seen in Fig. 1.

Fig. 12 is a top plan view on a reduced scale of the mold clamping actuator for the lift plate.

Fig. 13 is a bottom plan view on a reduced scale of the lift plate of the device and the companion mold clamping structure carried thereby.

Fig. 14 is a bottom plan view on a reduced scale of the dispensing head structure of the device.

In carrying out my invention I preferably grind the meat, ordinarily in raw form, and form an emulsion of the meat which is generally customary in preparing meat for sale or use in loaf form. Any kind of meat may be used, such as beef, pork, veal, etc., and the meat emulsion is formed by the addition of seasoning substances, water, and other ingredients well known in the art.

The meat emulsion is preferably placed in a suitable storage container commonly known as an air stuffer (not shown herein but illustrated in my copending application Serial No. 214,732, filed June 20, 1938) for valve-controlled delivery under pressure to the molds. Referring to the drawings, I have provided a nozzle-like dispensing head A of my molding device; this head having a laterally projecting tubular portion 10 threadedly carrying the transverse pin 11 having a tapered portion 12 releasably clamping one end portion 13 of a goose-neck delivery pipe B. A nut 14 engages the threads of pin 11 for drawing the pin in clamping engagement with the pipe B. The other end portion 15 of this delivery pipe B is flanged at 16 for connection with the stuffer which supplies the emulsion under pressure to the pipe B.

As shown in Fig. 3, the pin 11 accommodates adjustment of pipe B to any position of rotation about the pipe portion 13, the flange 16 moving in arc 17 so that the dispensing head A may be quickly and conveniently connected to the usual valve-controlled outlet pipe from the stuffer.

The head A has a meat storage delivery chamber 18 of relatively large capacity with relation to that of the mold C, the chamber 18 being defined by opposed front and rear walls 19, 20 and the end walls 21, 22. The tubular portion 10 provides the opening at 23 to chamber 18, the latter having a delivery outlet 24 within the rectangular abutment flange 25 which projects laterally from around the bottom of head A integrally with the walls of chamber 18.

The opposing walls 19, 20 and 21, 22 diverge downwardly from each other from the laterally arched top connecting wall 26 to form an enlarged zone portion 27 of chamber 18. Below the zone 18 the aforesaid pairs of opposed walls converge downwardly toward each other to the outlet 24 which is thereby formed to restrict the chamber 18 and prevent gravity displacement of the emulsion downwardly from head A between the mold filling operations when the pressure at delivery pipe B is cut off.

The molding device comprises a supporting base D of rectangular form, this base having a centrally located upstanding guide pin 28 surrounded by an annular shouldered guideway 29. The base D is formed adjacent its corners with an inwardly extending boss 30 (Figs. 7, 8 and 11) each vertically bored to receive the reduced end portion 31 of an upstanding spacer support rod 32, a fastener 33 holding each rod in position.

The rods 32 extend through openings 34 (Fig. 13) of the lift plate E to accommodate vertical clamping movement of the lift plate guided by the rods 32. The upper ends of rods 32 extend through openings 35 (Fig. 14) of the flange 25 of head A, each rod having its upper end portion threaded at 36 to receive a supporting nut 37 below flange 25 and a wing nut 38 above this flange. By loosening the wing nuts 38 the nuts 37 may be screwed up or down to adjustably space the head A relative to base D and lift plate E to accommodate molds of varying height as will presently be more apparent. The wing nuts 38 serve to lock the head A in any desired position of adjustment on rods 32.

The actuator F is annular in form and is centrally apertured at 39 in its flange 40 to rotatably fit the shoulder 29 which serves to support the actuator. This actuator has a lever portion 41 extending forwardly through a longitudinally elongated opening 42 in the front wall 43 of base D, the lever terminating in an upstanding handle portion 44 adapted for actuation by the operator of the device. At its margin the actuator F has an annular series of lift cams 45 which are preferably levelled off or flattened at their respective upper end portions at 46 as best illustrated in Fig. 6.

The lift plate E has its under face formed with a complementary annular series of cams 47 adapted to fit cams 45 and likewise levelled off at their lower ends at 48 to engage the flats 46 of cams 45 when handle 44 is fully rotated in its lifting stroke to the left hand end of opening 42 as illustrated in Fig. 1. The plate E is also formed with the central downwardly extending guide 49 which slidably receives guide pin 28 for guiding plate E during its vertical movement.

The plate E has the laterally spaced longitudinally extending ribs 50 forming a channeled guideway therebetween for slidably receiving the open top molding pan or container C herein illustrated as rectangular in shape. A transverse rib 50' serves to locate the mold C longitudinally on the lift plate E. In order to seal the molding device against escape of the meat during the pressure filling operation, the flange 25, when a sealing means is desired, has its bottom face recessed at 51 around opening 24 to receive the strip of abutment sealing material 52 of rubber composition for example, the material 52 preferably being cemented in position and presenting its undersurface substantially in a plane containing the outlet 24. The material 52 is engaged by the upper edge of mold C and is of such width to insure such engagement and to accommodate a wide variety of molds of different capacities.

Referring now to my indicator and air venting means, the head A is formed with a downwardly opening cylinder 53 slidably receiving a piston 54 having a stem 55 projecting upwardly through the cylinder in view of the operator and carrying a nut 56 limiting downward movement of the piston under the action of a spring 57 so that normally the lower face of the piston is flush with the lower face of flange 25 and the sealing material 52. An air vent 58 establishes communication between container mold C and the atmosphere around the head A as soon as piston 54 is raised to a slight extent.

In the operation of my molding device the parts are assembled as illustrated and handle 44 is swung to the right hand end of opening 42 to cause the cams 45 to allow the lift plate E to be lowered to the initial position shown in Fig. 9. The operator then slides the mold C along the lift plate E between ribs 50 until it engages the cross rib 50' to quickly locate the mold in proper position for filling. In order to facilitate rapid insertion of the mold between the ribs 50, the latter are diverged outwardly at 50'' at the mold receiving ends of these ribs.

With the mold inserted in position the operator then shifts the handle to the left, as viewed in Fig. 1, causing the actuator F to rotate sufficiently to lift the plate E and mold C upwardly by the action at cams 45 and 47 until the upper edges or rim of the mold are pressed tightly against the sealing material 52. At this time the flats 46 and 48 are engaged so that there is no tendency of the handle 44 and plate E to return to their aforesaid initial positions.

The usual valve controlling the supply of the meat emulsion is then opened causing delivery of the emulsion under pressure through delivery pipe B and into chamber 18 whence the meat is forced downwardly from the head A to fill the mold C. As the mold fills, the piston 54 is forced outwardly by the air trapped in the mold by reason of the seal 52 which is air-tight and has the further function of compensating for any irregularities in the mold rims. When piston 54 lifts, the vent 58 allows the trapped air to escape to thereby allow the mold C to fill quickly and uniformly.

When the mold is filled the emulsion forces the piston to rise beyond the vent 58 thereby advising the operator that the mold is filled, the operator watching the indicator stem 55. In this manner excess and localized pressure on the meat in the mold is avoided thereby insuring against bulges forming in the loaf during the baking process. Such bulges have a tendency to form during baking at points in the loaf where pressure of the meat is localized and my indicator assists in advising the operator of the minimum time of filling the mold.

When the indicator stem 55 fully rises, the operator shuts off the valve to cut-off the delivery of emulsion to the head A and the piston 54 is restored by spring 57. The handle 44 is then actuated to the right thereby lowering the plate E and the filled mold C which is withdrawn preferably by lifting so as to assist in levelling the top of the molded loaf by scraping or wiping along the under face of flange 25. Another mold is then inserted and the cycle of operations is repeated.

The chamber 18 preferably has a relatively large storage capacity in proportion to that of the mold C. In the illustration the chamber 18 has roughly two-thirds of the capacity of the mold so that the mold quickly fills and so that the pressure behind the large mass of meat in chamber 18 causes this mass to be suddenly discharged into the mold where it "expands" and spreads out evenly longitudinally in the mold.

My molding device accommodates emulsion delivery pressures in the neighborhood of 80 pounds per square inch or more where dense molding is desired although lesser pressures are often used depending on the density of emulsion and desired density of the molded product. The chamber 18 operates to supply the aforesaid large mass of meat uniformly and avoids streaks and voids which occur in more conventional methods.

When the mold is withdrawn after filling, the restricted formation of the chamber above outlet 24 prevents the meat in the chamber from falling downwardly by gravity. Ordinarily the pan molds are greased before filling in order to prevent the molded loaf from sticking to the pan. It is sometimes desired to line the pans with caul fat and because of the movement of my lift plate E without tilting, the pans may be inserted and withdrawn in such instances without danger of scaping off the caul fat at the rims of the molds. In other words, the rim of the mold is maintained parallel with the under surface of the head A at flange 25 during movement of plate E.

For very fast molding operations an assistant or tender is often employed in operating my molding device to handle the pans while the operator manipulates handle 44 with one hand and the emulsion delivery valve with the other hand.

After the mold has been filled it is usually cooked with or without a pressure top applied or the molded meat is baked preferably in the same mold C. In my copending application Serial No. 212,095, filed June 6, 1938, I have shown and described one form of a pressure top suitable for application to the mold during the cooking process.

Various modifications and changes will be apparent from my disclosure and I do not limit my invention in its broader aspects to the particular form and arrangement of parts as illustrated and described.

I claim:

1. In a device for molding meat emulsion in a container mold, a dispensing head structure having an inlet adapted to receive the emulsion under pressure and a downwardly directed outlet, a base for supporting said head structure with the latter spaced above said base, said base having an upstanding guide pin and an annular shouldered guideway surrounding the pin, a lift plate disposed between said base and head structure for supporting the mold, said plate having a downwardly opening guideway slidably receiving said pin for guiding vertical movement of said plate, a cam carried by the lift plate and projecting downwardly therefrom, an annular actuating member disposed between said base and lift plate, said actuating member being supported on and centered for rotation by said shouldered guideway, said actuating member having an upstanding cam adapted to engage the first said cam, and means for rotating said actuating member to cause the cam thereof to lift said plate to position the mold adjacent said outlet.

2. In a device for molding meat emulsion in a container mold, a dispensing head structure having an inlet adapted to receive the emulsion under pressure and a downwardly directed outlet, a supporting base, a plurality of upright rods for supporting the head structure from the base, a lift plate disposed between the base and head structure for supporting the mold, said plate having guideways slidably engaged by said rods respectively, means carried by said base for guiding upward movement of said lift plate, and manually operable means for moving said plate to position the mold adjacent said outlet, said head structure having a flange projecting outwardly and surrounding said outlet and engaging the upper ends of said rods and limiting upward movement of the mold with the top thereof disposed substantially in the plane of said outlet, said outlet being of substantially less area than that of the top of said mold whereby a portion of said flange overhangs the top of said mold inwardly thereof between the mold top and the outlet.

3. In a device for molding meat emulsion under pressure in a mold having an open top bounded by a rim, a dispensing head structure having a meat discharge outlet, means for securing the mold with the rim thereof disposed around said outlet and in contact with said head structure, and indicating means including an element adapted for operation by the meat discharged from said outlet into the mold for advising the operator when the mold is filled, said element having a meat-engaging portion thereof normally disposed at the level of said mold rim prior to said operation thereof by the meat.

4. In a device for molding meat emulsion under pressure in a mold having an open top bounded by a rim, a dispensing head structure having a meat discharge outlet, means for securing the mold with the rim thereof disposed around said outlet and in contact with said head structure, said head structure having a cylinder adjacent said outlet and adapted to communicate with the mold, and a piston operable in said cylinder and having an indicating stem projecting exteriorly of said head structure, said piston having a face disposed approximately in a plane containing said mold rim and said outlet for operation of the piston by the meat when the mold is filled.

5. A device for molding meat according to claim 4, wherein the head structure is formed with a vent passage between the cylinder and the atmosphere surrounding the head structure, said vent passage being controlled by operation of the piston.

CONRAD T. LENZKE.